United States Patent [19]
Harwood et al.

[11] Patent Number: 6,007,892
[45] Date of Patent: *Dec. 28, 1999

[54] FLOOR COVERINGS

[75] Inventors: Ivor C. Harwood, Leicestershire; Gary John Wilson; Keith Melvin Jones, both of Coventry; Michael David Gansser-Potts, London, all of United Kingdom

[73] Assignee: The Amtico Company Limited, Coventry, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/754,579

[22] Filed: Nov. 21, 1996

[30] Foreign Application Priority Data

Nov. 21, 1995 [GB] United Kingdom .................... 9523780

[51] Int. Cl.⁶ ........................................................ B32B 3/02
[52] U.S. Cl. ............................ 428/95; 428/172; 428/195; 428/204; 428/207; 428/332; 428/462; 428/515; 156/72; 156/209; 156/231; 156/235
[58] Field of Search ..................................... 428/516, 142, 428/172, 195, 204, 203, 207, 517, 519, 521, 332, 515, 462, 95, 174, 391; 156/243, 277, 79, 209, 231, 235, 313, 72

[56] References Cited

U.S. PATENT DOCUMENTS

| | | | |
|---|---|---|---|
| 4,011,358 | 3/1977 | Roelots ...................................... | 428/287 |
| 5,225,263 | 7/1993 | Baravian et al. .......................... | 428/95 |
| 5,288,349 | 2/1994 | Fink ......................................... | 156/72 |
| 5,304,272 | 4/1994 | Rohrbacker et al. .................... | 156/209 |
| 5,316,861 | 5/1994 | Marchal et al. .......................... | 428/516 |
| 5,334,450 | 8/1994 | Zabrocki et al. ......................... | 428/332 |
| 5,439,725 | 8/1995 | Roberts .................................... | 428/95 |
| 5,466,320 | 11/1995 | Burt et al. ............................. | 156/244.19 |

FOREIGN PATENT DOCUMENTS

| | | |
|---|---|---|
| 0 264 708 | 4/1988 | European Pat. Off. . |
| 0 484 797 A2 | 5/1992 | European Pat. Off. . |
| 43 13 037 C1 | 8/1994 | Germany . |
| 57085446 | 5/1982 | Japan . |
| 2 013 564 | 5/1979 | United Kingdom . |
| WO 95/08593 | 3/1995 | WIPO . |

OTHER PUBLICATIONS

Derwent WPI Accession No. AN 82–91107E & JP 57 149 564 A; European Plastics News; "Heightened Interest in Coextrusion for the Packaging Sector".

Primary Examiner—Deborah Jones
Assistant Examiner—Abraham Bahta
Attorney, Agent, or Firm—Pennie & Edmonds LLP

[57] ABSTRACT

A backing film for incorporation as a backing layer in a resilient floor covering or a floor tile having at least two laminae and a method for making such a backing layer whereby wastage is reduced when the color of the upper lamina is changed. Where there are two backing films having two or three laminae making up the backing layer the intermediately colored film resulting from a change in the color of the upper lamina can be utilized without further processing on the second backing film where color is not essential. Where there are three laminae making up a backing film the desired color is introduced and established in the bottom lamina before the supply of the original color to the upper lamina is stopped. The film can then be turned over for use with the former bottom lamina becoming the upper lamina.

24 Claims, 2 Drawing Sheets

FLOOR COVERINGS

TECHNICAL FIELD

This invention relates to methods of manufacturing films for incorporation as backing layers in resilient floor coverings, to films made by such methods and to floor coverings incorporating them.

BACKGROUND ART

Resilient floor coverings are well known and are described for example in an article entitled "Flooring Materials" in Encyclopaedia of Polymer Science and Engineering, Wiley-Interscience, Volume 7 (1987), pages 233–247. Such floor coverings, as described in that article, are composite materials which comprise a transparent or translucent wear (upper) layer, often a decorative (intermediate) layer such as a printed patterned layer, and one or more backing (lower) layers. The composition of each layer in such composite laminate floor coverings is chosen to provide the desired balance of physical properties, both in that layer and in the whole composite laminate. Thus, for example, the properties of all the layers are desirably balanced so as to avoid curl.

The backing layer nearest the wear layer commonly contains one or more colored pigments and is commonly called the face ply. If no intermediate decorative layer is present, then the face ply itself provides the desired decorative appearance of the floor covering. If the floor covering includes a printed patterned layer, then the face ply serves to enhance the appearance of the printed patterned layer as seen through the wear layer. The face ply is often of a bright color, for example white, although it may be of a neutral color such as black. The other backing layers more remote from the wear layer commonly contain carbon black to provide a neutral opaque background behind the face ply. All the backing layers, including the face ply, commonly contain fillers such as calcium carbonate, hydrated aluminium oxide, kaolin or other suitable particulate or fibrous mineral fillers.

Films for incorporation in resilient floor coverings may be made by extrusion of suitable polymer compositions. For example, the backing layers including the face ply may be made by extrusion of polymer compositions based on ethylene/vinyl acetate or ethylene/alkyl acrylate, for example methyl or butyl acrylate, copolymers. It is often desirable to make differently-colored face plies at different times on a single extruder. Steps must therefore be taken to minimise the production of waste film at changeover. The extruder may be stopped, emptied and cleaned, but this is laborious and involves loss of production from the extruder whilst this is done. Alternatively, the color of the polymer composition fed to the extruder may be changed while the extruder continues to run, and waste film of intermediate color may be collected until the extruder has been flushed. This waste film can be shredded and used (with the addition of carbon black, if desired) for the manufacture of black backing layers. Nevertheless, this procedure requires additional operations to be carried out, and these operations may result in some degradation of properties of the thusly recycled polymer composition.

It is an object of the present invention to provide improved methods of manufacturing a film for incorporation as backing layer in resilient floor coverings, in particular a film which includes a face ply and to reduce loss of production when the color of a face ply is changed.

SUMMARY OF THE INVENTION

The present invention provides in a first aspect a method of manufacturing a film for incorporation as a backing layer in a resilient floor covering characterised in that at least a first and a second polymer composition are extruded to form a film laminate for use as the backing layer.

Preferably where there are two polymer compositions, a first polymer composition and a second polymer composition, the first polymer composition is a colored polymer composition. The second polymer composition may be colored a masking color such as black, iron-oxide red, blue, or any dark masking color.

There may be three polymer layers extruded to form the film. Preferably when there are three polymer compositions, a first, a second and a third polymer composition, the first and/or third polymer compositions are colored polymer compositions and the second layer/composition is of masking color. The second polymer composition may also be a colored polymer composition.

Preferably the second polymer composition of both systems is a "black" polymer composition. "Black" in the context of this specification includes true black, dark red, dark blue, or any color capable of masking the presence of other colors.

When the backing layer is a face ply the color of the colored polymer composition is chosen to provide the face ply color, and it will accordingly be understood that this color may be any color, including black, or including lighter colors such as white, yellow, beige, pale greens or blues, pink.

The invention provides in a second aspect a film suitable for incorporation as a backing layer in a resilient floor covering characterised in that it is a coextruded laminate of at least two polymer compositions.

Preferably where there are two polymer compositions the film is a coextruded laminate of (a) a first colored polymer composition and (b) a "black" polymer composition.

Preferably where there are three polymer compositions the film is a coextruded laminate of (a) a first colored polymer composition, (b) a "black" polymer composition and (c) a third polymer composition.

The invention provides in a third aspect a resilient floor covering comprising a transparent or translucent wear layer and a backing layer characterised in that the backing layer comprises, in sequential order from the wear layer, at least one backing film which is a coextruded laminate of at least two polymer compositions.

The floor covering may comprise a transparent or translucent wear layer and two (or more) backing layers, or plys. Preferably where there are two polymer compositions the backing layer comprises in sequential order from the wear layer (a) a first backing film which is a coextruded laminate of (aa) a first colored polymer composition visible as face ply through the wear layer and (ab) a "black" polymer composition, and (b) a second backing film of substantially the same thickness as the first backing film.

The first colored polymer composition (aa) may be of any color, including black. The second backing film (b) may be a coextruded laminate of (ba) a second colored polymer composition and (bb) a "black" polymer composition. The second colored polymer composition (ba) may be of any color, including black. Layers (aa) and (ba) are preferably of substantially the same thickness, with the consequence that layers (ab) and (bb) are also preferably of substantially the same thickness. The floor covering of the invention preferably additionally comprises a printed patterned layer as decorative layer interposed between the wear layer and the first backing film.

Preferably where there are three polymer compositions the backing layer comprises in sequential order from the wear layer (a) a first backing film which is a coextruded laminate of (aa) a first colored polymer composition visible as face ply through the wear layer (ab) a "black" polymer composition, and (ac) a third polymer composition.

Preferably a second backing film (b) is provided.

The first colored polymer composition (aa) may be of any color including black. The third polymer composition (ac) may be of any color including black. The second backing film (b) may be a coextruded laminate of (ba) a second colored polymer composition (bb) a "black" polymer composition and (bc) a third polymer composition. The second colored polymer composition (ba) may be of any color, including black. The third polymer composition (bc) may be of any color including black. Layers (aa) and (ba) are preferably of substantially the same thickness, with the consequence that layers (ab) and (bb) are also preferably of substantially the same thickness as are layer (ac) and (bc). The floor covering of the invention preferably additionally comprises a printed patterned layer as decorative layer interposed between the wear layer and the first backing film.

The invention provides in a fourth aspect a method of manufacturing a resilient floor covering, including the steps of:

i) co-extruding at least two polymer compositions to form a laminate to serve as a first backing film; and ii) laminating together in sequential order a) a transparent or translucent wear layer, b) at least one backing film, whereby the first polymer composition is visible through the wear layer.

Preferably where there are two polymer compositions the method of manufacturing a resilient floor covering, includes the steps of:

(i) coextruding a first colored polymer composition and a black polymer composition to form a laminate to serve as first backing film; and (ii) laminating together in sequential order (a) a transparent or translucent wear layer, (b) the first backing film and (c) a second backing film of substantially the same thickness as the first backing film, whereby the colored polymer composition is visible through the wear layer.

The first colored polymer composition may be of any color, including black. Preferably, a decorative layer such as a printed patterned layer is interposed between the wear layer (a) and the first backing film (b) prior to the lamination step (ii). The second backing film may be a coextruded laminate of a second colored polymer composition and a "black" polymer composition, wherein the second colored polymer composition may be of any color, including black.

Preferably where there are three polymer compositions the method of manufacturing a resilient floor covering, includes the steps of:

(i) coextruding a first colored polymer composition, a "black" polymer composition and a third polymer composition to form a laminate to serve as first backing film; and (ii) laminating together in sequential order (a) a transparent or translucent wear layer, (b) at least one backing film, whereby the colored polymer composition is visible through the wear layer.

Preferably a second backing film of substantially the same thickness as the first backing film is provided.

The first colored polymer composition and the third polymer composition may be of any color, including black. Preferably, a decorative layer such as a printed patterned layer is interposed between the wear layer (a) and the first backing film (b) prior to the lamination step (ii). The second backing film may be a coextruded laminate of a second colored polymer composition, a "black" polymer composition and a third polymer composition, wherein the second colored polymer composition and the third polymer composition may be of any color, including black.

The invention provides in a fifth aspect a method of reducing the amount of waste produced when the color of a face ply is changed in a resilient floor covering having a wear layer and a backing layer comprising at least one backing film wherein said backing film comprises a laminate formed from at least a first and a second polymer composition comprising the steps of:

(i) changing the formulation of the first polymer composition in the laminate to provide a new color whereby the color changes through intermediate shades from an original colored polymer composition to a new colored polymer composition; and (ii) using the intermediately colored laminate in the backing layer of the resilient floor covering wherein the intermediately colored polymer composition is positioned away from the wear layer in that it is not visible therethrough.

Preferably when the color of the face ply is changed in a resilient floor covering having two backing layers the method comprises the steps of:

i) co extruding at least a first polymer composition and a "black" polymer composition to form a laminate to serve as a first backing film ii) changing the formulation of the first colored polymer composition in the laminate to provide a new color whereby the color changes through intermediate shades from the original colored composition to the new polymer composition while the original color is flushed out;

iii) using the intermediately colored laminate as the second backing film in a resilient floor covering which sequentially comprises a wear layer, a first backing layer and a second backing layer.

The co-extruded laminate may comprise a first colored polymer composition, a "black" polymer composition and a third polymer composition.

The method of the first aspect of the invention where the laminate comprises two or three polymer compositions may be carried out using conventional coextrusion techniques. When it is desired to change the color of the face ply, the formulation of the colored polymer composition fed to the extruder is changed to provide the desired new color. As a consequence, the color of the colored polymer layer in the coextruded laminate steadily changes from that of the original colored composition through intermediate shades to that of the new polymer composition whilst polymer of the original color is flushed from the system. According to prior practices, this intermediately-colored laminate would require to be dealt with as waste material. According to the invention, however, it may be immediately used without additional processing as the second backing film in a resilient floor covering which sequentially comprises a wear layer, a first backing film and a second backing film. The intermediately-colored layer of the second backing film is preferably disposed towards the interior of the composite laminate floor covering, because the color of this portion of the floor covering is not critical. The invention thus offers appreciable advantages of simplicity of operation and cost in comparison with prior art techniques.

It will be appreciated that the first and second backing films in the floor covering and the third and fourth aspects of the invention are preferably of substantially the same thickness in order that intermediately-colored first backing film can be used conveniently as the second backing film.

The thickness of the wear layer in the floor covering of the third aspect of the invention is preferably of about in the range 50 to 1000 micron, more preferably 250 to 750 micron. The thickness of the decorative printed patterned layer, if one is used, is preferably in the range of about 25 to 125 micron. The thickness of the backing layer may be in the range of about 1 to 4 mm, often about 1.5 to 3 mm. Thus, the thickness of the first and second backing films may each be in the range of about 0.5 to 2 mm, often about 0.75 to 1.5 mm. The thicknesses of the two laminae constituted by the colored and the black polymer compositions in the backing film of the invention may be the same or different. For example, the colored lamina may be about 250 micron thick and the black lamina may be about 650 micron thick. It will be recognized that the thicknesses of these various films, layers and laminae are within the choice of the designer and producer of the floor covering, and are not markedly critical to the practice of the invention.

Preferably when the color of the face ply is changed in a resilient floor covering having at least one backing layer the method comprises the steps of:

i) coextruding a first polymer composition, a "black" polymer composition and a third polymer composition to form a laminate to serve as a first backing film;

ii) changing the formulation of the third polymer composition to provide a new color prior stopping the supply of color to the formulation of the first polymer composition whereby the color of the third polymer composition is well established before the color of the first colored polymer composition is changed;

iii) turning the coextruded laminate over such that the third polymer composition forms the colored face ply layer.

Adding color pigment to the composition of the first or third polymer composition increases the cost of the laminate, so we do not want to run colored first and third layers simultaneously always, but we do want to have a length of run where there are good colored first and third layers (different colors) so that we can use the third layer of the laminate as the face ply before we stop coloring the first layer so there is no, or greatly reduced, amount of laminate which cannot be used as face ply with one of its first or third layers next to the wear layer.

The method of the first aspect of the invention where the laminate comprises three polymer compositions may be carried out using conventional coextrusion techniques. When it is desired to change the color of the face ply, the formulation of the third polymer composition fed to the extruder is changed to provide the desired new color prior to the emptying of the supply of the formulation of the first colored polymer composition. As a consequence, the color of the third polymer layer in the coextruded laminate is well established before the color in the first colored polymer composition runs out. According to the invention, the complete coextruded laminate can be turned over such that the third polymer composition forms the colored face ply layer and the first colored polymer composition forms the layer beneath the black polymer composition layer.

It will be appreciated that the first and third polymer composition are preferably of substantially the same formulation with the exception of their color in order that the third polymer layer and the first colored polymer layer can be interchanged.

To enable the first and third lamina to be interchangeable when the film is turned over it is desirable to have the same amount of filler in each of the first and third polymer compositions. However, having a high filler content, such as about 70% by weight in the first and third polymer compositions can cause the film to curl. In an embodiment of the invention the backing film may be extruded with filler contents of about 70% by weight in the first polymer composition and about 50% by weight filler in the third polymer composition to overcome the problem of curl. When the color of the third lamina is changed the filler content may be changed such that when the tile is turned over, so that the third lamina forms the first colored lamina, the third lamina has a higher filler content. The filler content of the first polymer composition may be reduced when the filler content of the third polymer composition is increased to avoid curl of the backing layer.

Filler can also be introduced into the second polymer composition to increase adhesion to the first and third polymer composition.

A second backing layer of substantially the same thickness as the first may be provided.

The thickness of the wear layer in the floor covering of the seventh aspect of the invention is preferably in the range of about 50 to 1000 micron, more preferably 250 to 750 micron. The thickness of the decorative printed patterned layer, if one is used, is preferably in the range of about 25 to 125 micron. The thickness of the backing layer may be in the range of about 1 to 4 mm, often about 1.5 to 3 mm. Thus, the thickness of the first and second backing films may each be in the range of about 0.5 to 2 mm, often about 0.75 to 1.5 mm. It will be recognised that the thicknesses of these various films, layers and laminae are within the choice of the designer and producer of the floor covering, and are not markedly critical to the practice of the invention.

The polymer compositions of the backing films of the invention and of the floor coverings containing them described hereinabove may be any of those known as suitable for the manufacture of floor coverings, although it will be understood that the polymer compositions used in the backing films must be susceptible of extrusion. Preferred polymer compositions for use in the backing films include compositions based on ethylene/vinyl acetate or ethylene/alkyl acrylate, for example methyl or butyl acrylate, copolymers. These polymer compositions generally comprise at least about 10, preferably at least 20, percent by weight total fillers and pigments. These polymer compositions are preferably highly-filled polymer compositions which contain at least about 50 percent, preferably at least about 60 percent, often about 65 percent, by weight of one or more fillers, for example calcium carbonate, hydrated aluminium oxide or kaolin. The polymer compositions may contain up to about 75 percent by weight filler. A polymer composition for use in a backing film, including a colored polymer composition for use in a face ply, may contain about 5 to about 10 parts by weight of a binder polymer per 100 parts by weight (parts per hundred, phr) of the polymer on which the composition is based. Suitable binder polymers include ethylene/alkyl acrylate/maleic anhydride terpolymers. Such a binder polymer may permit the incorporation of higher proportions of filler than can be otherwise achieved and may also serve to promote adhesion between films. A face ply composition contains a pigment in addition to any filler; for example it may contain about 1 to 20 phr, often about 10 phr, of a white pigment such as titanium dioxide. A "black" polymer composition for use in a backing film generally contains about 1 to 5 phr, often about 3 phr, of a black pigment such as carbon black.

The invention provides in a sixth aspect a method of making floor tiles comprising:

i) taking the coextruded laminate of the present invention
ii) cutting the laminate into suitable shapes.

The invention provides in an seventh aspect a method of laying a resilient floor covering comprising:

i) securing the tiles of the sixth aspect to the floor of a room; and
ii) polishing the tiles to provide a finish.

Preferably the tiles are secured to the floor by an adhesive.

Preferably the tiles are polished with a wax or silicone based polish.

It has been observed that polymer compositions containing high levels of pigment and filler, for example more than about 40 percent by weight, may suffer from the problem of die lip build-up when they are extruded. Small quantities of the highly-filled polymer composition are diverted at the point of extrusion from the main body of the film and adhere to the face of the die along the edges of the lips. This built-up material may be degraded by exposure to continual hot conditions. It may ultimately become detached from the die lips and adhere to the film, becoming embedded in the film when it is passed between polishing rollers. This results in the production of low quality film.

The invention accordingly provides in a eighth aspect a method of manufacturing a film for incorporation as a backing layer in a resilient floor covering, characterised in that (a) a colored first polymer composition containing not more than about 30 percent by weight total pigment and filler, (b) a "black" second polymer composition, and (c) a third polymer composition containing not more than about 30 percent by weight total pigment and filler are coextruded to form a film laminate for use as the backing layer. The colored first polymer composition may be of any color, including black.

The method of the ninth aspect of the invention has the advantage that the backing film is produced as a sandwich comprising a highly-filled core between less heavily-filled outer laminae. The problem of die lip build-up is thus avoided. The ninth aspect of the invention can be used in combination with any preceding aspect of the invention i.e. a three ply backing film may be made in accordance with it.

The invention provides in a tenth aspect a film suitable for incorporation as a backing layer in a resilient floor covering, characterised in that it is a coextruded laminate of (a) a colored first polymer composition containing not more than about 30 percent by weight total pigment and filler, (b) a "black" second polymer composition, and (c) a third polymer composition containing not more than about 30 percent by weight total pigment and filler.

The invention provides in eleventh aspect a resilient floor covering comprising a wear layer and a backing layer, characterised in that the backing layer comprises a film according to the tenth aspect of the invention. The wear layer is transparent or translucent. The floor covering preferably additionally comprises a printed patterned layer interposed as decorative layer between the wear layer and the film. The invention provides in an twelfth aspect a method of manufacturing a resilient floor covering, including the steps of:

(i) coextruding (a) a colored first polymer composition containing not more than about 30 percent by weight total pigment and filler, (b) a "black" second polymer composition and (c) a third polymer composition containing not more than about 30 percent by weight total pigment and filler to form a backing film laminate; and (ii) laminating together a transparent or translucent wear layer and the backing film laminate, whereby the colored first polymer composition is visible through the wear layer.

The colored first polymer composition may be based for example on an ethylene/alkyl acrylate copolymer. It generally contains about 10 to about 30, often about 20, percent by weight total fillers and pigments. A white composition may contain about 1 to 20, often about 10, percent by weight titanium dioxide. A black composition may contain about 1 to 5, often about 3, percent by weight carbon black. The fillers used in the colored first polymer composition may be any of the fillers mentioned above for the highly filled polymer compositions. The thickness of the colored first lamina is preferably in the range about 10 to about 150 micron, often about 50 micron. The "black" second polymer composition may be as described hereinabove for highly-filled black polymer compositions, and the thickness of the corresponding lamina may be about 500 to about 1000 micron. The third polymer composition may be based for example on polyethylene or other suitable polymers and copolymers. It generally contains fillers and pigments as described for the colored first polymer composition and is often black. The thickness of the third lamina may be in the range about 10 to about 150 micron, often about 20 micron.

If desired, any of the composite backing films of the invention may include an adhesive interlayer between the adjacent laminae, in conventional manner for coextruded films.

The wear layer of the floor coverings of the invention may be of known type, and generally comprises one or more calendered or extruded films, which are preferably transparent or translucent. Preferred materials for manufacture of the wear layer include ionomers of the SURLYN type (Trade Mark of DuPont). Such materials are described in U.S. Pat. No. 3,264,272 and U.S. Pat. No. 3,322,734. The floor coverings of the invention may be used in sheet or tile form.

BRIEF DESCRIPTION OF THE DRAWINGS

The invention will now be more particularly described with reference to the accompanying drawings, in which.

DETAILED DESCRIPTION OF THE PREFERRED EMBODIMENTS

Figure 1:
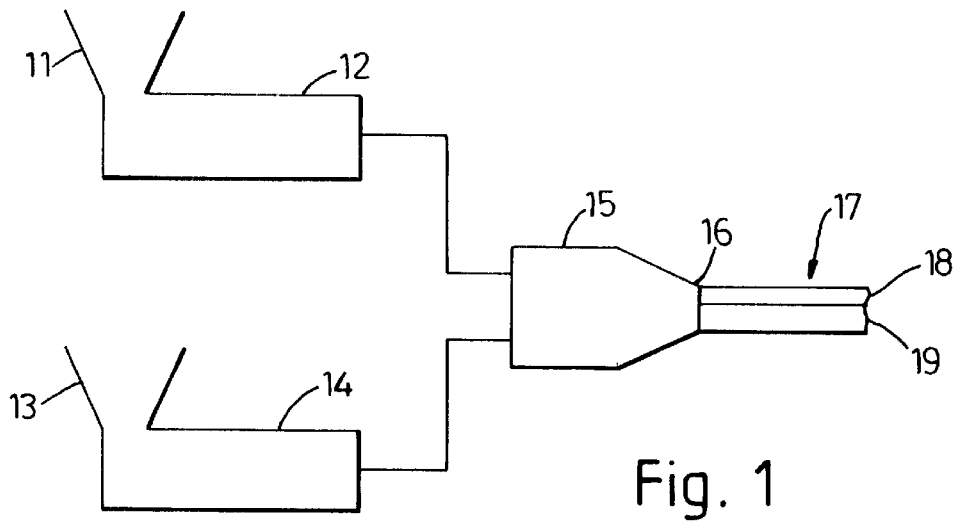
FIG. 1 illustrates diagrammatically the manufacture of a coextruded backing film according to the invention.

Referring to FIG. 1, a first colored polymer composition is supplied from a hopper 11 to a screw extruder 12 in which it is melted and from which it is fed to a feed block 15. A black (true black, eg carbon black pigment) polymer composition is supplied from a hopper 13 to a screw extruder 14 in which it is melted and from which it is supplied to the feed block 15. The molten polymer compositions are combined within the feed block 15 and extruded through a die 16 at 20 m/min to produce a coextruded laminate 17 consisting of a first colored layer 18 which is 250 micron thick and a black layer 19 which is 660 micron thick. The first colored polymer composition is based on a blend of ethylene/methyl acrylate (EMA) and ethylene/butyl acrylate (EBA) copolymers, such blends being commonly referred to as EDA polymers. Suitable EDA polymers are available from Elf-Atochem under the Trade Mark Lotryl. The first colored polymer composition comprises 10percent by weight titanium dioxide and 20 percent by weight calcium carbonate (Calmote MG, Trade Mark, available from Croxton & Garry Limited). The black polymer composition is based on EDA and comprises 3 percent by weight carbon black and 20 percent by weight Calmote MG.

When it is desired to change the color of the first polymer composition the formulation of the first colored polymer composition supplied from hopper 11 to screw 12 is changed. The color of the first colored polymer layer 18 changes steadily from the original color through intermediate shades to that of the new color. The intermediately colored laminate 17 can be used immediately without additional processing as the second backing film 28 (see FIG. 2). The intermediately colored layer forms the colored layer 29 and is disposed towards the center of the composite laminate floor covering where the color is not critical.

Figure 2:
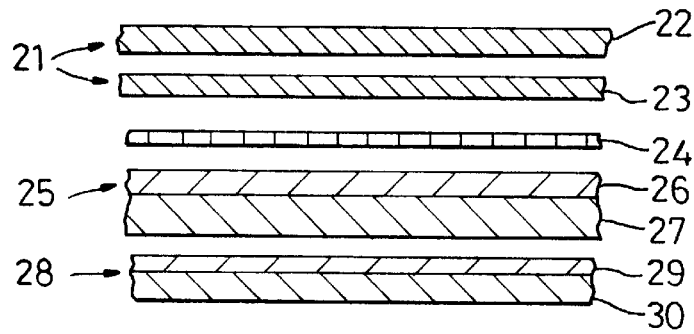
FIG. 2 shows an assembly of films suitable for the manufacture of a resilient floor covering according to the invention in which the backing layers are manufactured by the process illustrated in FIG. 1.

Referring to FIG. 2, a stack of films assembled ready for subjection to hot lamination, thereby producing a floor covering according to the invention, has the following layers and films in sequential order:

(1) A transparent wear layer 21 which consists of two extruded films 22, 23 of ionomer resin (an ethylene/methacrylic acid copolymer partially neutralised with zinc ions, available from DuPont under the Trade Mark "SURLYN"), optionally including a polyolefinic compound such as trimethylolpropane trimethacrylate as described in WO-A-95/08593 each film being 290 micron thick;

(2) A printed patterned layer 24 which is an extruded ionomer film, 75 to 100 micron thick printed with a decorative pattern;

(3) A first backing film 25 which is a coextruded film according to the invention has a first colored lamina 26 and a first black lamina 27, the manufacture of which has already been described with reference to FIG. 1; and (4) A second backing film 28 which is a coextruded film consisting of a second colored lamina 29 which is 250 micron thick and a second black lamina 30 which is 660 micron thick.

The wear layer 21 may be a coextruded laminate, or may consist of two extruded films 22,23 laminated together. The printed patterned layer may for example be based on an acrylate polymer or on an ionomer resin as described for the wear layer films 22, 23. The second backing film 28 is made in same way as the first backing film 25. The second black lamina 30 is of the same composition as the first black lamina 27. The second colored lamina 29 may be of the same composition as the first and second black laminae 27, 30, or of the same or similar composition as the first colored lamina 26. In the latter case, the second colored lamina 29 may be substandard in color or appearance in comparison with the first colored lamina 26. The surfaces of one or more of the films and layers 21,24,25,28 may be subjected to adhesion-promoting treatment, for example flame treatment or corona discharge, prior to lamination. The printed pattern may be disposed at the undersurface of the layer 24, and this surface may be coated with an adhesive primer to ensure good adhesion to the film 25.

Figure 3:
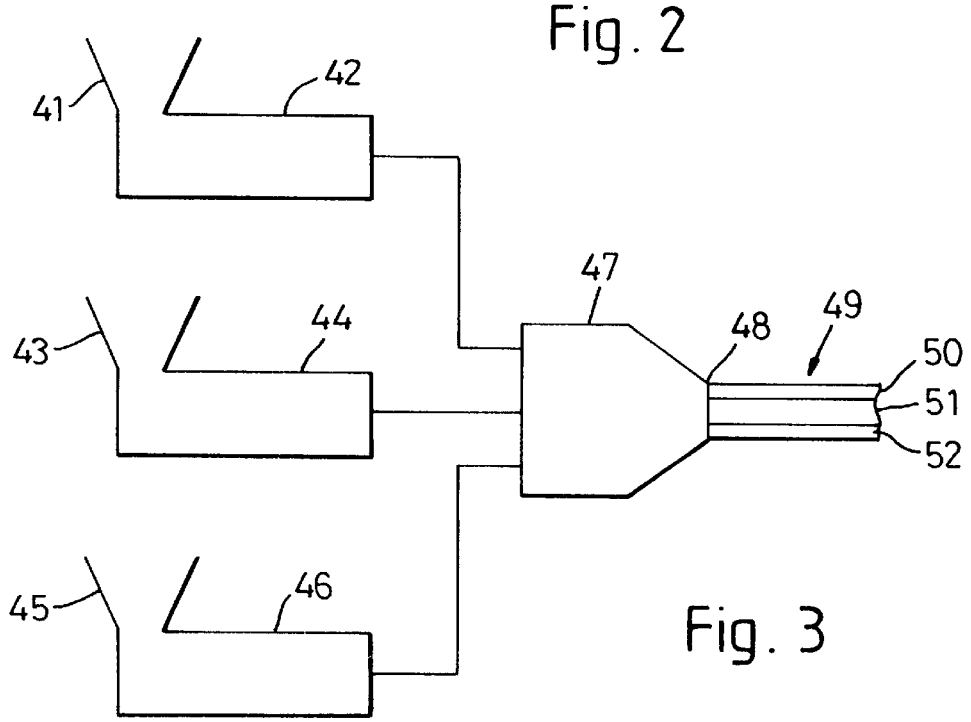
FIG. 3 illustrates diagrammatically the manufacture of an alternative form of a coextruded backing film according to the invention.

Referring to FIG. 3, a first colored polymer composition is supplied from a hopper 41 to a screw extruder 42 in which it is melted and from which it is fed to feed a block 47. A "black" second polymer composition is supplied from a hopper 43 to a screw extruder 44 in which it is melted and from which it is supplied to the feed block 47. A third polymer composition is supplied from a hopper 45 to a screw extruder 46 in which it is melted and from which it is supplied to the feed block 47. The molten polymer compositions are combined within the feed block 47 and extruded through a die 48 at 20 m/min to produce a coextruded laminate 49 consisting of a colored first layer 50 which is 50 micron thick, a black second (middle) layer 51 which is 840 micron thick, and a third layer 52 which is 20 micron thick. The first colored first polymer composition is as described hereinabove for the colored lamina 26. The black second polymer composition contains 30% EDA (LOTRYL, Trade Mark of Elf-Atochem), 42% calcium carbonate, 25% kaolin and 3% carbon black, by weight. If desired, it may contain recycled material. The third polymer composition is as described hereinabove for the black lamina 27 or the colored lamina 26.

If the viscosities of adjacent polymer compositions are markedly different, for example if they differ by a factor of 2 or more, alternative known coextrusion technologies may be preferred, for example using a multi-manifold die instead of a feed block.

When it is desired to change the color of the first colored layer 50 where the formulation of the first and third polymer composition are substantially the same the formulation of the third polymer composition supplied from hopper 48 to screw 46 is changed to provide a new color prior to the emptying of the supply of the formulation of the first polymer composition fed from hopper 42 to screw 42 such that the color of the third layer 52 is well established before the supply of color to the first colored polymer composition runs out. The coextruded laminate can then be turned over such that the third polymer composition provides the first colored layer.

Figure 4:
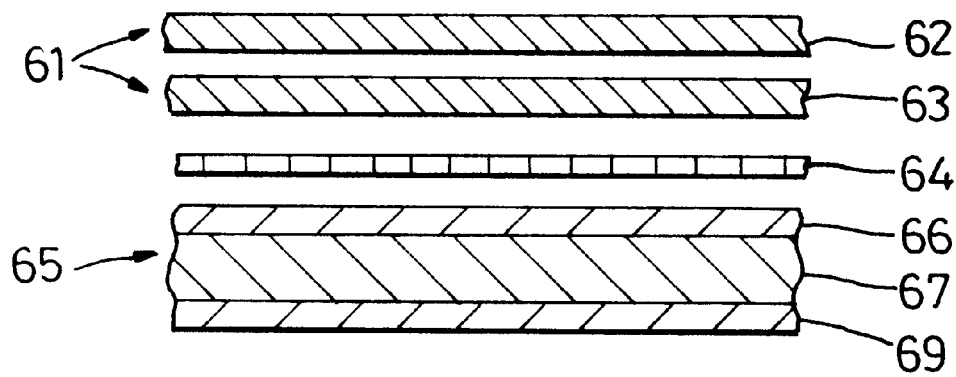
FIG. 4 shows an assembly of films suitable for the manufacture of a resilient floor covering according to the present invention in which the single backing layer is manufactured by the process illustrated in FIG. 3.

FIG. 4 shows a stack of films assembled ready for subjection to hot lamination, thereby producing a floor covering according to the invention and has the following layer in sequential order:

i) A transparent wear layer 61 identical to the wear layer 21 illustrated in FIG. 2;

ii) A printed patterned layer 64 identical to the printed patterned layer in FIG. 2.

iii) A backing film 65 which is coextruded film according to the invention consisting of a first colored lamina 66, a black lamina 67 and a third lamina 69, the manufacture of which has already been described with reference to FIG. 3.

Figure 5:
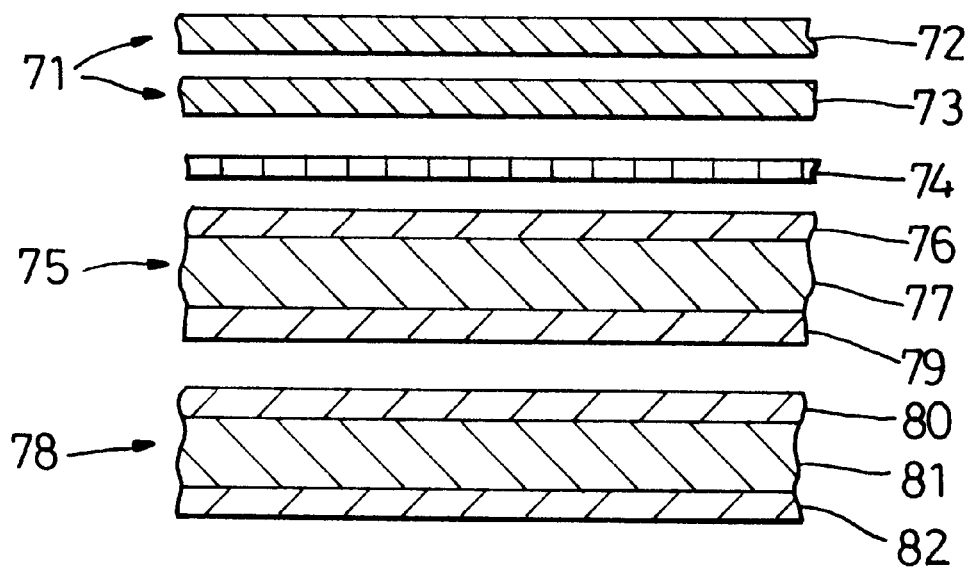
FIG. 5 shows an assembly of films suitable for the manufacture of a resilient floor covering according to the present invention in which the backing layers are manufactured by the process illustrated in FIG. 3.

FIG. 5 shows a stack of film assembled ready for subjection to hot lamination, thereby producing a floor covering according to the invention and has the following layers in sequential order:

i) A transparent wear layer 71 identical to the wear layer 61 in FIG. 3;

ii) A printed patterned layer 74 identical to the printed patterned layer 64 in FIG. 3;

iii) A first backing film 75 which is in a co-extruded film according to the invention consisting of a first colored lamina 78, a black lamina 77 and a third lamina 79, the manufacture of which has already been described with reference to FIG. 3;

iv) A second backing film 78 which is a coextruded film consisting of a second colored lamina 80, a black lamina 81 and a third lamina 82.

The second backing film 78 is made in the same way as the first backing film 75. The second black lamina 81 is of the same composition as the first black lamina 77. The second colored lamina may be of the same composition in the first and second black laminae 77,81 or of the same or similar composition on the first colored lamina 76. In the latter case the second colored lamina may be substandard in color or appearance in comparison with the first colored lamina 76.

The surfaces of one or more of the films and layers 61,64,65 in FIG. 4 and the film and layers 71,74,75,78 in FIG. 5 may be subjected to adhesion promoting treatment, for example flame treatment or corona discharge, prior to lamination. The printed pattern 64,74 may be disposed at the under surface of the layer 64,74 and this surface may be coated with an adhesive primer to ensure good adhesion to film 65,75.

In use the laminates made by the processes illustrated by FIGS. 1 and 3 are cut into tiles having a variety of shapes and are used to form resilient floor coverings in buildings. The tiles are secured to the floor of the building by use of an adhesive and once laid the resilient floor covering is polished with a wax based or silicone based polish to provide a safe and attractive finish.

What is claimed is:

1. A resilient floor covering which includes a backing layer comprising a coextruded laminate of at least first and second polymer compositions, wherein the backing layer is disposed adjacent to a floor surface that is to be covered.

2. The resilient floor covering according to claim 1, wherein said first polymer composition is a colored polymer composition and said second polymer composition is a masking polymer composition having a color which minimizes the visual effect of matter beneath it.

3. The resilient floor covering according to claim 2 wherein said backing layer further comprises a layer of a third polymer composition.

4. A resilient floor covering comprising a transparent or translucent wear layer and a backing layer wherein said backing layer comprises at least a first backing film which is a coextruded laminate of at least first and second polymer compositions, wherein the backing layer is disposed adjacent to a floor surface that is to be covered.

5. A resilient floor covering according to claim 4 wherein the backing layer comprises in sequential order from the wear layer a first backing film which is a coextruded laminate of the first and second polymer compositions wherein the first polymer composition is a first colored polymer composition that is visible as a face ply through the wear layer and the second polymer composition is a masking polymer composition, and a second backing film of substantially the same thickness as the first backing film, wherein said masking polymer composition comprises a masking color which minimizes the visual effect of matter beneath it.

6. A resilient floor covering according to claim 5 wherein said first colored polymer composition is white, yellow, beige, green, blue, pink or black.

7. A resilient floor covering film according to claim 5 wherein said second backing film is a coextruded laminate of a second colored polymer composition and a second masking polymer composition.

8. A resilient floor covering according to claim 7 wherein said second colored polymer composition is white, yellow, beige, green, blue, pink or black.

9. A resilient floor covering according to claim 7 wherein each of said first and second colored polymer compositions are of substantially the same thickness, and each of said first and second masking compositions are of substantially the same thickness.

10. A resilient floor covering according to claim 5 comprising a printed patterned layer as decorative layer interposed between the wear layer and the first backing film.

11. A resilient floor covering according to claim 4 wherein said first backing film further comprises a layer of a third polymer composition.

12. A resilient floor covering according to claim 11 wherein a second backing film is provided.

13. A resilient floor covering according to claim 12 wherein said second backing film comprises a second colored polymer composition, a second masking polymer composition, and a second layer of a third polymer composition, wherein the first and second colored polymer compositions are of substantially the same thickness, the first and second masking polymer compositions are of substantially the same thickness and the first and second layers of the third polymer composition are of substantially the same thickness.

14. A resilient floor covering according to claim 1, wherein the polymer compositions of the backing layer include about 10 to 75 percent by weight of filler.

15. A resilient floor covering according to claim 4, wherein the wear layer has a thickness of about 50 to 1000 microns, and the backing layer has a thickness of about 1 to 4 mm.

16. A resilient floor covering according to claim 4, wherein the polymer compositions of the backing layer include about 10 to 75 percent by weight of filler.

17. A resilient floor covering according to claim 5, wherein the wear layer has a thickness of about 50 to 1000 microns, and the backing layer has a thickness of about 1 to 4 mm, with each backing film having a thickness of between about 0.5 to 2 mm.

18. A resilient floor covering according to claim 5, wherein the polymer compositions of each backing layer include about 10 to 75 percent by weight of filler.

19. A resilient floor covering according to claim 3, wherein the first and third polymer compositions of the backing film each include about 10 to 75 percent by weight of filler.

20. A resilient floor covering according to claim 19, wherein the masking polymer composition has a thickness of about 500 to 1000 microns.

21. A resilient floor covering according to claim 19, wherein the first and third polymer compositions of the backing film each include no more than about 30 percent by weight of filler.

22. A resilient floor covering according to claim 19, wherein the first polymer composition includes no more than about 70 percent by weight of filler and the third polymer composition includes no more than about 50 percent by weight of filler.

23. A resilient floor covering according to claim 11, wherein the first and third polymer compositions of the backing film each include about 10 to 75 percent by weight of filler, and the masking polymer composition has a thickness of about 500 to 1000 microns.

24. A resilient floor covering according to claim 10 wherein the decorative layer has a thickness of about 25 to 125 microns.

\* \* \* \* \*